(12) United States Patent
Bruestle et al.

(10) Patent No.: US 7,100,584 B1
(45) Date of Patent: Sep. 5, 2006

(54) METHOD AND APPARATUS FOR CONTROLLING AN INTERNAL COMBUSTION ENGINE

(75) Inventors: Claus Bruestle, Fond du Lac, WI (US); Timothy S. Reid, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 7 days.

(21) Appl. No.: 10/964,990

(22) Filed: Oct. 14, 2004

(51) Int. Cl.
*F02B 33/00* (2006.01)
*F02B 29/04* (2006.01)
*F02B 33/44* (2006.01)

(52) U.S. Cl. .................. 123/563; 123/564; 60/599; 60/611

(58) Field of Classification Search ........ 123/563–564; 60/599, 611
See application file for complete search history.

(56) References Cited

U.S. PATENT DOCUMENTS

| | | | |
|---|---|---|---|
| 4,207,848 A | 6/1980 | Dinger et al. ............ 123/122 D |
| 4,513,729 A * | 4/1985 | Udd ............................. 123/563 |
| 4,716,734 A * | 1/1988 | Nakao et al. ................. 60/599 |
| 5,394,854 A | 3/1995 | Edmaier et al. ............. 123/563 |
| 6,378,506 B1 | 4/2002 | Suhre et al. ................. 123/564 |
| 6,394,076 B1 | 5/2002 | Hudelson .................... 123/540 |
| 6,405,692 B1 | 6/2002 | Christiansen .......... 123/65 BA |
| 6,408,832 B1 | 6/2002 | Christiansen ............... 123/563 |
| 6,460,337 B1 | 10/2002 | Olofsson .................... 60/605.1 |
| 6,508,233 B1 | 1/2003 | Suhre et al. ................. 123/478 |
| 6,561,169 B1 | 5/2003 | Sealy et al. ................. 123/563 |
| 2003/0150408 A1 | 8/2003 | Roithinger ............... 123/41.56 |
| 2005/0051145 A1* | 3/2005 | Joyce et al. ................. 123/563 |

FOREIGN PATENT DOCUMENTS

| | | | |
|---|---|---|---|
| DE | 3627686 A1 * | 11/1987 |
| JP | 61058918 A * | 3/1986 |
| JP | 62048923 A * | 3/1987 |
| JP | 63088220 A * | 4/1988 |
| JP | 03117649 A * | 5/1991 |

* cited by examiner

*Primary Examiner*—Thai-Ba Trieu
(74) *Attorney, Agent, or Firm*—William D. Lanyi

(57) ABSTRACT

An engine control system determines a desired temperature range of air flowing into an intake manifold of the engine as a function of an operating characteristic, such as the load on the engine or the operating speed of the engine. A bypass conduit is provided in parallel with a heat exchanger, wherein both the bypass conduit and the heat exchanger are connected to an outlet of a compressor to direct air from the compressor to an intake manifold along the parallel paths. By manipulating an air valve in the bypass conduit, an engine control unit can regulate the temperature at an inlet of the intake manifold. A desired temperature is selected from a matrix of stored values as a function of the load on the engine and the engine operating speed.

16 Claims, 2 Drawing Sheets

METHOD AND APPARATUS FOR CONTROLLING AN INTERNAL COMBUSTION ENGINE

BACKGROUND OF THE INVENTION

1. Field of the Invention

The present invention is generally related to a method for controlling an internal combustion engine and, more particularly, to a method for controlling the temperature of air flowing from a supercharger to an intake manifold of the engine for the purpose of improving the operating characteristics of the engine and preventing disadvantageous condensation within components of the air intake system.

2. Description of the Prior Art

Those skilled in the art of internal combustion engines and particularly marine propulsion systems are familiar with the use of superchargers in conjunction with the air induction system of the engine and, in some cases, the use of charge air coolers to reduce the temperature of the compressed air provided by the compressor, or supercharger.

U.S. Pat. No. 6,378,506, which issued to Suhre et al. on Apr. 30, 2002, discloses a control system for an engine supercharging system. A bypass control valve is controlled by an engine control module as a function of manifold absolute pressure and temperature within an air intake manifold in conjunction with the barometric pressure. An air per cylinder (APC) magnitude is calculated dynamically and compared to a desired APC value which is selected as a function of engine operating parameters. The air per cylinder value is calculated as a function of the manifold absolute pressure, the cylinder swept volume, the volumetric efficiency, the ideal gas constant, and the air inlet temperature. The volumetric efficiency is selected from stored data as a function of engine speed and a ratio of manifold air pressure to barometric pressure.

U.S. Pat. No. 6,405,692, which issued to Christiansen on Jun. 18, 2002, discloses an outboard motor with a screw compressor supercharger. An outboard motor is provided with an engine having a screw compressor which provides a pressurized charge for the combustion chambers of the engine. The screw compressor has first and second screw rotors arranged to rotate about vertical axes which are parallel to the axis of a crankshaft of the engine. A bypass valve regulates the flow of air through a bypass conduit extending from an outlet passage of the screw compressor to the inlet passage of the screw compressor. A charge air cooler is used in a preferred embodiment of the bypass conduit that extends between the cold side plenum of the charge air cooler and the inlet of the compressor. The bypass valve is controlled by an engine control module in order to improve power output from the engine at low engine speeds while avoiding any violation of existing limits on the power of the engine at higher engine speeds.

U.S. Pat. No. 6,408,832, which issued to Christiansen on Jun. 25, 2002, discloses an outboard motor with a charge air cooler. The outboard motor is provided with an engine having a screw compressor which provides a pressurized charge for the combustion chambers of the engine. The screw compressor has first and second screw rotors arranged to rotate about vertical axes which are parallel to the axis of a crankshaft of the engine. A bypass valve regulates the flow of air through a bypass conduit extending from an outlet passage of the screw compressor to the inlet passage of the screw compressor. The charge air cooler improves the operating efficiency of the engine and avoids overheating the air as it passes through the supercharger after flowing through the bypass conduit.

U.S. Pat. No. 6,508,233, which issued to Suhre et al. on Jan. 21, 2003, discloses a method for controlling a fuel system of a multiple injection system. A method for controlling a fuel system of a multiple injector engine provides a primary fuel injector and a secondary fuel injector which are both connected in fluid communication with an air stream flowing to a combustion chamber of the engine. Based on the total magnitude of fuel required to be injected into the air stream and as a function of the engine speed and percent load of the engine, first and second shares of the total magnitude of fuel are determined for the primary and secondary fuel injectors. The primary and secondary fuel injectors are then caused to inject their respective shares of the total fuel magnitude into the air stream, with the primary and second shares being determined as a function of engine speed and percent load of the engine.

U.S. patent application Ser. No. 10/300,766, which was filed by Roithinger on Nov. 21, 2002, describes a cooling system for an internal combustion engine. The cooling system is intended for use with an engine having a two-stage supercharging system. It includes a charge air line in which are provided a first compressor of a first turbo charger and a second compressor of a second turbo charger downstream of the former. A first charge air cooler is provided between the first and second compressors. A second charge air cooler is provided downstream of the second compressor. At least one of the two charge air coolers is disposed upstream of the coolant cooler as seen in flow direction of the cooling air, wherein the second charge air cooler is disposed above or beside the first charge air cooler.

U.S. Pat. No. 6,561,169, which issued to Sealy et al. on May 13, 2003, describes a charge air management system for an automotive engine. The system provides air charge densification and cooling during periods of operation at higher load. Two air ducts are provided, with a first for furnishing uncooled and unboosted air, and with a second duct for furnishing chilled and boosted air, with the second duct being chilled during operation with air flowing through the first conduit.

U.S. Pat. No. 4,207,848, which issued to Dinger et al. on Jun. 17, 1980, describes a charging air heat exchanger installation. The system is intended for charging air of a low compression reciprocating piston internal combustion engine operating with exhaust gas turbo supercharging, which is equipped with a first charging air water heat exchanger that during the starting and partial load operation supplies the heat energy of a heater device to the charging air and which can be connected to the cooling water circulation of the internal combustion engine, and with a second charging air water heat exchanger which is connected to the cooling water circulation external to the engine; the two charging air water heat exchangers are thereby adapted to be traverse in parallel by the charging air while a control system enables a stepless control of the charging air flow through the individual heat exchangers as a function of the temperature of the charging air upstream of the cylinders and the operating condition of the internal combustion engine.

U.S. Pat. No. 6,394,076, which issued to Hudelson on May 28, 2002, describes an engine charge air cooler. The system includes a charge air compressing system, a refrigerant cycling system, and a charge air cooling apparatus for transferring heat from the compressed charged air of the charge air compressing system to the refrigerant fluid of the refrigerant cycling system. The charge air cooling apparatus comprises a housing with a charge air passage for charge air moving through the housing. A plurality of fins are positioned in the charge air passage. A fluid tube is provided in the housing and passes through each of the fins in a plurality of locations.

U.S. Pat. No. 6,460,337, which issued to Olofsson on Oct. 8, 2002, describes a combustion engine. A turbo-fed internal combustion engine has a first and a second exhaust gas valve per cylinder, these exhaust gas valves each being connected to their respective exhaust manifold. One exhaust manifold conducts exhaust gases to an exhaust gas turbine and the other exhaust manifold conducts subsequent exhaust gases past this exhaust gas turbine which drives a compressor for charge air. The intake valve of the cylinder is arranged so as, as the engine speed increases, to close either earlier, before the piston reaches its bottom dead center, or later, after the piston has past its bottom dead center. In this way, the temperature increase resulting from compression in the cylinder is reduced. Cooled air from the compressor can be taken in so as to obtain an adequate degree of filling in the cylinder, with a lower final temperature.

U.S. Pat. No. 5,394,854, which issued to Edmaier et al. on Mar. 7, 1995, describes a cooling system for a supercharged internal combustion engine. The cooling system has a high temperature and a low temperature circulating system, in which two charge air coolers, through which coolant for different temperature level flows, are provided for cooling the charge air in two stages. The high temperature circulating system comprises a main branch with the internal combustion engine and a high temperature recooler which is connected in series with it. So that the total quantity of coolant may be kept low and a high degree of heat exchange can be achieved while the arrangement of the pipes is simple, the coolant quantity flowing out of the secondary circulating system is admixed to a coolant flow leading to the internal combustion engine, and the total coolant flow flowing out of the internal combustion engine is then guided to the high temperature recooler. The coolant quantity required in the secondary branch is branched off the coolant flow flowing to the internal combustion engine which flows away from the high temperature recooler and to which coolant quantities are possibly admixed that flow away from the high temperature charge air cooler and from the low temperature charge air cooler and from the low temperature charge air cooler. The low temperature circulating system comprises a low temperature recooler with a series connected low temperature charge air cooler.

The patents described above are hereby expressly incorporated by reference in the description of the present invention.

When a supercharger is used in conjunction with an internal combustion engine of an outboard motor, the air compressing action of the supercharger raises the temperature of air flowing through the supercharger as that air is compressed and flows from the supercharger outlet. In certain applications, a charge air cooler is used to reduce the temperature of the compressed air flowing from the supercharger. This cooling has the effect of increasing the density of the compressed air and, therefore, the operational capability of the internal combustion engine in which that compressed air is used.

When the engine is operating at low loads and speeds, the availability of compressed air is less advantageous than when it is operating at high loads and speeds. When the supercharger, such as a screw compressor, is deactivated or operated in a way that results in less work being done to compress the air, the effect of a heat exchanger, which cools the air from the supercharger, can result in deleterious conditions. As an example, the cooled air from the heat exchanger can reduce the percentage of suspended fuel in the air/fuel mixture that is in a vapor state as it passes into the cylinders of the engine. If the air flowing into the intake manifold of the engine is at a temperature lower than its optimum temperature, fuel efficiency and exhaust emissions can also be significantly compromised.

It would therefore be beneficial if a system could be provided that regulates the temperature of air passing into the intake manifold as a function of the operating characteristics of the engine so that a heat exchanger can be used to reduce the temperature of compressed air when this reduction in temperature is advantageous, but also to decrease the effect of the heat exchanger when the cooling of the compressed air is not beneficial.

SUMMARY OF THE INVENTION

A method for controlling an engine, according to a preferred embodiment of the present invention, comprises the steps of providing an intake manifold to direct air to cylinders of an internal combustion engine, compressing air flowing to the intake manifold, directing a first portion of a stream of compressed air through a heat exchanger, conducting the first portion of the stream of compressed air to the intake manifold, and changing a temperature of air flowing to the intake manifold as a function of at least one operating characteristic of the engine.

A preferred embodiment of the present invention further comprises the steps of directing a second portion of the stream of compressed air to the intake manifold and conducting the second portion of the stream of compressed air along the parallel path with the heat exchanger. The changing step can comprise a step of controlling the flow of the second portion of the stream of compressed air along the parallel path. The controlling step can comprise a step of actuating an air valve which is disposed in fluid communication with the parallel path. The operating characteristic of the engine which is used to determine the appropriate temperature of air flowing into the intake manifold can be a load on the engine or an operating speed of the engine. The changing step can comprise a step of changing an amount of air flowing through the heat exchanger. Alternatively, the changing step can comprise the step of changing an amount of cooling water flowing through the heat exchanger.

The present invention can comprise the steps of determining a magnitude of load on the engine, measuring a temperature of air at an inlet of the intake manifold, selecting a temperature range as a function of the load on the engine, and measuring an operating speed of the engine. The temperature changing step can comprise the steps of comparing the temperature to the temperature range and changing the temperature of air flowing to the intake manifold to cause the temperature to be within the temperature range. In addition, the selecting step can select the temperature range as a dual function of both load on the engine and the operating speed of the engine.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
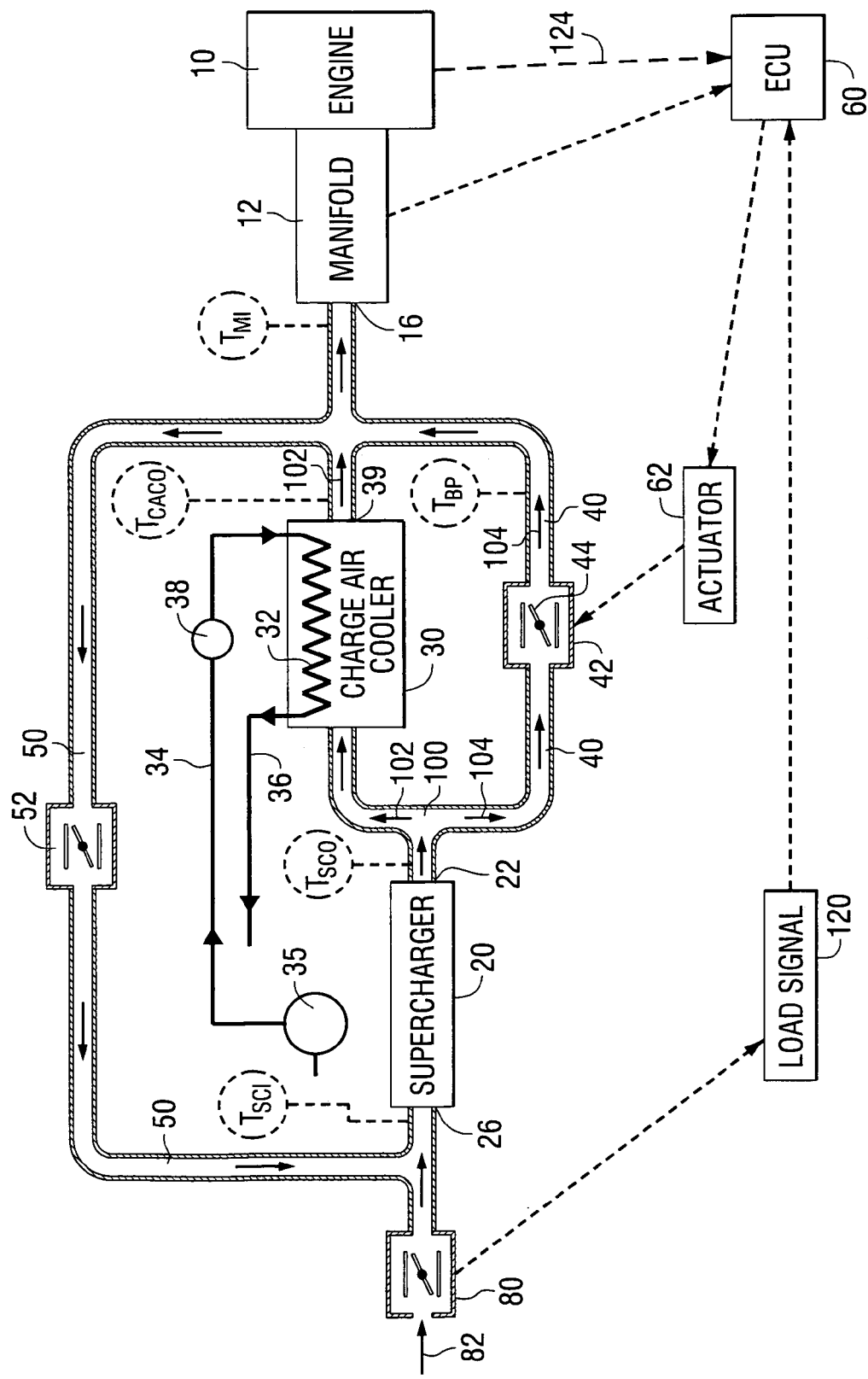
FIG. 1 is a schematic representation of a marine propulsion system incorporating the present invention.

Throughout the description of the preferred embodiment, like components will be identified by like reference numerals.

FIG. 1 is a schematic representation of a marine propulsion system. An engine 10 has an intake manifold 12 through which air flows to the cylinders of the engine 10. The intake manifold 12 has an inlet 16. A compressor 20 has an outlet 22 that is connected in fluid communication with the inlet 16 of the intake manifold 12. The supercharger or compressor 20, can be a screw compressor in a preferred embodiment of the present invention. A heat exchanger 30 is connected in fluid communication between the outlet 22 of the compressor 20 and the inlet 16 of the intake manifold 12. A bypass conduit 40 is connected in fluid communication between the outlet 22 of the compressor 20 and the inlet 16 of the intake manifold 12. The bypass conduit 40 is connected in parallel with the heat exchanger 30.

The heat exchanger 30 can be a charge air cooler that uses water flowing through coils 32 with the air flowing in thermal communication with the coils 32. Also shown in FIG. 1 is a water inlet conduit 34 and a water outlet conduit 36 of the heat exchanger 30. A pump 35 draws water from a body of water in which the system is operating and induces the water to flow through inlet conduit 34, heat exchanger 30, and outlet conduit 36. The water flowing through the heat exchanger 30 is directed in thermal communication with the charge air. A water valve 38 can be provided so that the flow of cooling water through the heat exchanger 30 can be controlled.

With continued reference to FIG. 1, a bypass circuit is provided from the outlet 39 of the heat exchanger 30 back to the inlet 26 of the supercharger compressor 20. This bypass conduit, which is identified by reference numeral 50, has an air valve 52 connected in fluid communication with it.

The air valve 52 shown in FIG. 1 is similar in design and function to the bypass system described and illustrated in U.S. Pat. No. 6,378,506. In that patent, the bypass conduit is identified by reference numeral 60 and the valve is identified by reference numeral 70. U.S. Pat. No. 6,405,692 also describes the function of the bypass circuit relating to a screw compressor and an associated charge air cooler. In U.S. Pat. No. 6,405,692, the bypass conduit is identified by reference numeral 110 and the valve is identified by reference numeral 114. Since bypass conduits and air valves associated with screw compressors and charge air coolers are well known to those skilled in the art, their function will not be described in detail herein. However, it should be clearly noted and understood that the system shown schematically in FIG. 1 is provided with two bypass conduits. The conduit identified by reference numeral 50 in FIG. 1 is generally known to those skilled in the art and described above in the patents which are cited. The bypass conduit 40, which is connected in parallel with the heat exchanger 30, provides the advantages of the method of the present invention and is not generally known to those skilled in the art.

The bypass conduit 40 is provided with an air valve 42 that allows an engine control unit 60 to regulate the flow of air through the bypass conduit 40. This is done by using the actuator 62 which moves the throttle plate 44 of the air valve 42. The actuator 62 can be a stepper motor. As can be seen in FIG. 1, when the air valve 42 is closed, virtually all of the air from the supercharger outlet 22 is forced to flow through the heat exchanger 30 as it flows either to the inlet of the intake manifold 12 or through the other bypass conduit 50 back to the inlet 26 of the compressor 20. When the air valve 42 is opened, the relative restrictions of the air is valve 42 and the heat exchanger 30 will result in a proportional amount of air passing through the bypass conduit 40.

In order to facilitate the description of the present invention, temperature sensors are schematically represented by dashed lines in FIG. 1. A temperature sensor is associated with the outlet 22 of the supercharger 20 to measure the air temperature as it exits from the outlet 22. This temperature is identified in FIG. 1 as $T_{SCO}$. The temperature at the outlet of the charge air cooler 30 is identified as $T_{CACO}$. The temperature of the air passing through the bypass conduit 40 is identified as $T_{BP}$. The temperature of the air flowing into the inlet 16 of the intake manifold 12 is identified as $T_{MI}$. The temperature entering the inlet 26 of the supercharger is identified as $T_{SCI}$. Although not connected to the engine control unit 60 in FIG. 1, it should be understood that these temperatures can be available, in certain embodiments of the present invention, to the software in the microprocessor of the engine control unit 60. As a result, the engine control unit 60 can have access to the temperatures that it needs to determine the optimum control of the system shown in FIG. 1.

An air valve 80, such as a throttle body of the engine 10, is used to regulate the flow of air, represented by arrow 82, into the total air induction system. After passing through the throttle body, or air valve 80, the air flows into the inlet 26 of the compressor, or supercharger 20, out of its outlet 22 and toward the junction identified by reference numeral 100. From there, a first portion of the stream of compressed air, as indicated by arrow 102, can flow through the heat exchanger 30 and to the inlet 16 of the intake manifold 12. A second portion of the stream of compressed air, indicated by arrow 104, can be directed to the inlet 16 of the intake manifold 12 through the parallel path provided by the bypass conduit 40. The relative magnitudes of the first and second portions of the stream of compressed air, indicated by arrows 102 and 104, respectively, are determined by the condition of the air valve 42 and, more particularly, by the position of the throttle plate 44 that is controlled by the actuator 62. The engine control unit 60 controls the actuator 62.

It can be seen that the relative magnitudes of the first and second portions, 102 and 104, will determine the temperature of the air flowing into the inlet 16 of the intake manifold 12. In other words, $T_{MI}$ is a function of temperatures $T_{CACO}$ and $T_{BP}$ and the position of the throttle plate 44 of the air valve 42. As a result, the temperature $T_{MI}$ flowing into the inlet 16 of the intake manifold 12 can be controlled, within certain limits, by the engine control unit 60 which manipulates the air valve 42 by controlling the actuator 62. The range of magnitudes of the temperature $T_{MI}$ can vary from a low temperature of $T_{CACO}$ to a high temperature of $T_{BP}$, as a function of the air valve 42.

Also shown in FIG. 1 is a load signal 120 provided to the engine control unit 60 which is related to the position of the air valve 80 of the throttle body. The operating speed of the engine 10 can be provided by a crankshaft position sensor, or a tachometer, as represented by signal line 124. In this way, the engine control unit 60 can use the magnitude of the engine load, represented by the position of the air valve 80, and the magnitude of the operating speed of the engine 10, as received from a crankshaft speed sensor on line 124. After receiving information relating to the load and operating speed of the engine 10 and the temperature $T_{MI}$ at the inlet 16 of the intake manifold 12, the engine control unit 60 can change the temperature $T_{MI}$ by manipulating the air valve 42 to change the rate of air flow through the bypass conduit 40. By opening the air valve 42, the effective temperature $T_{MI}$ can be increased and by closing the air valve 42 this temperature can be decreased.

As is generally known to those skilled in the art of internal combustion engine design, increasing temperature of air flowing into an intake manifold decreases the pumping losses of the engine. Also, increasing the temperature of intake air increases the percentage of vapor in the fuel mixture flowing into the engine. Similarly, under appropriate conditions, increasing the temperature of intake air decreases the likelihood that fuel condensation will occur in and around the intake manifold 12.

Figure 2:
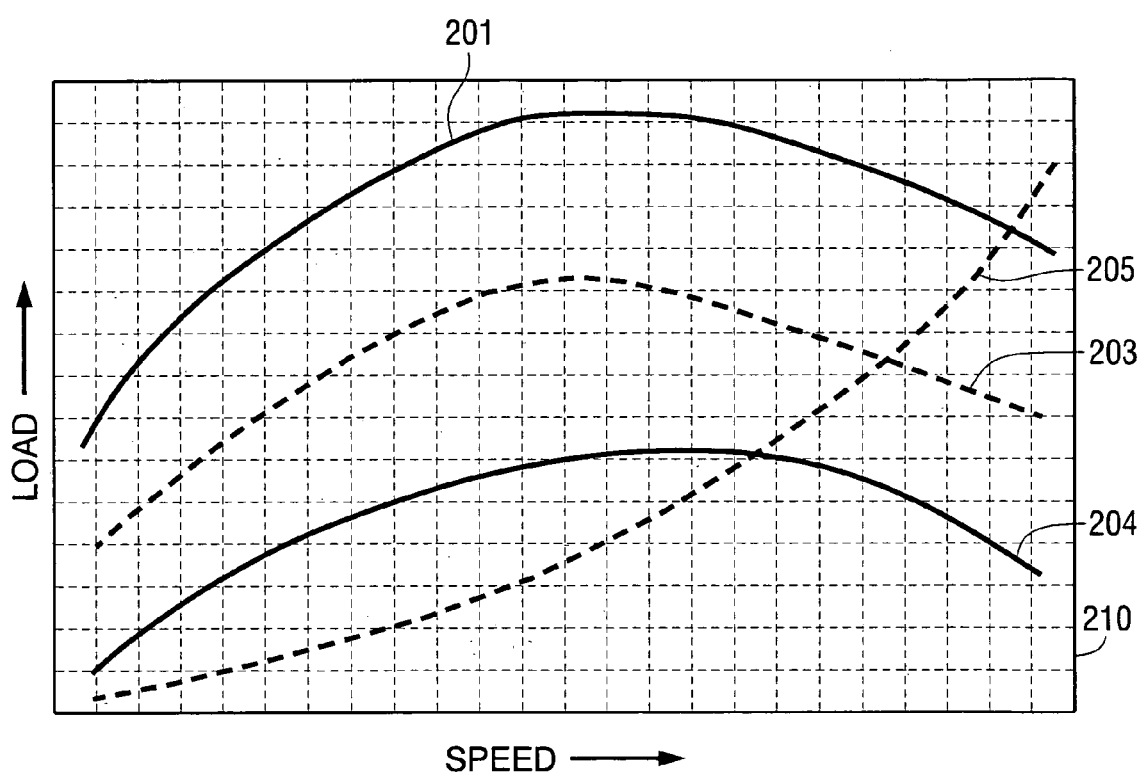
FIG. 2 is a graphical representation of operating conditions of an engine of a marine propulsion system in combination with a matrix of stored values for desired temperatures at the inlet of an intake manifold of the engine.

FIG. 2 is a graphical representation of various conditions of an internal combustion engine 10 which are illustrated as a dual function of the operating speed of the engine and the load on the engine. It should be understood that FIG. 2 is not empirically derived and is intended to represent certain variables merely for the purpose of facilitating the explanation of the present invention. In FIG. 2, line 201 represents a wide opened throttle (WOT) condition, wherein the air valve 80 is fully opened with bypass valve 52 fully shut to produce maximum torque. When operating the engine 10 in the region near line 201, it is beneficial to have the air at the inlet 16 of the intake manifold 12 as cold as possible. In other words, air valve 42 would be closed and as much air as possible would be directed through the heat exchanger 30, or charge air cooler. The first portion of the stream of compressed air emanating from the supercharger 20 would be, essentially, one hundred percent of the output from the outlet 22 of the compressor 20. With the air valve 42 fully opened, line 203 represents the operating conditions (speed/load) that initiate the onset of combustion knock in the engine's combustion chamber. When operating in the region between lines 203 and 201, the temperature $T_{MI}$ at the inlet 16 of the intake manifold 12 would be regulated to control knock of the engine 10. When operating in the region between lines 203 and 201, the air valve 42 is modulated to provide the hottest air possible but yet not excessively hot to produce combustion knock. Line 204 represents the condition where the intake manifold's absolute pressure is atmospheric (corresponding to a supercharger pressure ratio of 1.0). In general, above this line the supercharger increases the temperature of the intake air. In the region below line 204, when the compressor 20 is providing minimal work in compressing air, the temperature $T_{SCO}$ will roughly be equal to $T_{SCI}$.

With continued reference to FIG. 2, dashed line 205 represents the operation of a marine vessel with gradual changes in throttle position with relatively gradual changes in engine operating speed and engine load. It is provided to show a typical gradual change in speed and load as a marine vessel is operated. It can be seen that this boat load curve 205 passes through several of the zones that are defined between lines 201, 203, and 204. As this occurs, the temperature requirements of the inlet 16 of the intake manifold 12, for optimum performance, change. According to the present invention, the engine control unit 60 would manipulate the actuator 62 to change the temperature $T_{MI}$ according to previously determined temperatures that are stored as a function of both speed and load. To illustrate this point, the grid 210 in FIG. 2 is divided into two hundred and forty individual units. Each of these units represents a temperature value stored in the memory of a microprocessor. After determining the load on the engine 10 and the operating speed of the engine, the engine control unit 60 would determine the preselected temperature corresponding to that particular combination of speed and load by selecting it from the values stored in the matrix or grid as a function of the load and speed. That temperature would then be the desired temperature for the air entering the inlet 16 of the intake manifold 12. By measuring the actual temperature $T_{MI}$, the engine control unit 60 can easily determine whether or not the air valve 40 should be more opened or more closed from its present position to increase or decrease, respectively, temperature $T_{MI}$. Each of the boxes of the matrix 210 shown in FIG. 2 would have a temperature stored for that particular corresponding combination of speed and load. In order to facilitate the control of the temperature $T_{MI}$ at the inlet 16 of the intake manifold 12, the engine control unit 60 could easily determine an acceptable range of temperatures above and below the stored desired temperature obtained from the matrix 210 and regulate the temperature flowing into the intake manifold 12 so that it remains within that calculated range. If a load and/or speed of the engine changes, the engine control unit 60 would again select the appropriate temperature from the matrix 210, based on the new speed and load, and regulate the temperature $T_{MI}$ accordingly.

As described above, it can be seen that a method for controlling an engine provided by the present invention comprises the steps of providing an intake manifold 12 to direct air to cylinders of an internal combustion engine 10. It also comprises the step of compressing the air, by a supercharger 20, flowing to the intake manifold 12. Another step of the present invention is directing a first portion 102 of a stream of compressed air through a heat exchanger 30 and conducting the first portion 102 of the stream of compressed air to the intake manifold 12. Another step of the present invention is the changing of temperature $T_{MI}$ of air flowing to the intake manifold 12 as a function of at least one operating characteristic of the engine, such as the load on the engine or the operating speed of the engine.

A preferred embodiment of the present invention further comprises the step of directing a second portion 104 of the stream of compressed air to the intake manifold 12 and conducting the second portion 104 along a parallel path with the heat exchanger 30. This is accomplished through the use of the bypass conduit 40 and air valve 42. The temperature changing step of the present invention comprises a step of controlling the flow of the second portion 104 of the stream of compressed air along the parallel path. It can comprise the step of actuating, with an actuator 62, an air valve 42 which is disposed in fluid communication with the parallel path. In essence, the temperature changing step of the present invention comprises the step of changing an amount of air flowing through the heat exchanger 30.

It should be understood that an alternative embodiment of the present invention can comprise the step of changing the condition of water valve 38 to affect the rate of flow of cooling water through conduits 34 and 36. This will also have the effect of decreasing the thermal communication occurring between the first portion 102 of the incoming air and the water flowing through the heat exchanging coils 32 of the charge air cooler. When the load and operating speed is determined, the method of the present invention includes the steps of measuring a temperature $T_{MI}$ of air at an inlet 16 of the intake manifold 12, selecting a temperature range as a function of the load on the engine, such as by selecting a temperature from the box shown in the matrix 210, comparing the actual measured temperature $T_{MI}$ to the selected temperature range and changing the temperature $T_{MI}$ of air flowing to the intake manifold 12 in order to cause the measured temperature $T_{MI}$ to be within the determined temperature range.

Although the present invention has been described with particular specificity and illustrated to show a preferred embodiment, it should be understood that alternative embodiments are also within its scope.

We claim:

1. A method for controlling a marine engine control system for an outboard motor comprising:
   an intake manifold directing combustion air to cylinders of an internal combustion engine;
   a compressor having an inlet and an outlet and compressing air flowing to said intake manifold;
   a charge air cooler having an inlet and an outlet and cooling compressed air flowing to said intake manifold;
   a first bypass conduit having an inlet and an outlet;
   a second bypass conduit having an inlet and an outlet;
   a first junction having an inlet from said outlet of said compressor, and having first and second outlets, said first outlet of said first junction being connected to said inlet of said charge air cooler, said second outlet of said first junction being connected to said inlet of said first bypass conduit;
   a second junction having first and second inlets, and having first and second outlets, said first inlet of said second junction being connected to said outlet of said charge air cooler, said second inlet of said second junction being connected to said outlet of said first bypass conduit, said first outlet of said second junction being connected to said intake manifold, said second outlet of said second junction being connected to said inlet of said second bypass conduit,
   said method comprising controllably changing the temperature of compressed air flowing to said intake manifold as a function of at least one operating characteristic of said engine.

2. The method according to claim 1 comprising controllably changing said temperature of said compressed air flowing to said intake manifold by controlling cooling thereof by said charge air cooler.

3. The method according to claim 2 comprising providing said charge air cooler as a heat exchanger, and pumping water through said heat exchanger, and comprising controllably changing said temperature of said compressed air flowing to said intake manifold by variably changing at least one of the amount of air flowing through said heat exchanger and the amount of water flowing through said heat exchanger.

4. The method according to claim 3 comprising:
   providing an air valve controlling the amount of air flow through said first bypass conduit;
   controllably changing the temperature of compressed air flowing to said intake manifold by variably changing the amount of air flowing through said heat exchanger by varying the amount of air flow through said first bypass conduit by operating said air valve.

5. The method according to claim 3 comprising:
   providing a water valve controlling the amount of water flow through said heat exchanger;
   controllably changing the temperature of compressed air flowing to said intake manifold by variably changing the amount of water flowing through said heat exchanger by varying the amount of water flow therethrough by operating said water valve.

6. The method according to claim 3 comprising providing a first valve, and providing at least one of a second and third valve, said first valve being an air valve controlling the amount of air flow through said second bypass conduit, said second valve being a water valve controlling the amount of water flow through said heat exchanger, said third valve being an air valve controlling the amount of air flow through said first bypass conduit, and comprising controlling the amount of compressed air flowing to said intake manifold by operating said first valve, and controllably changing the temperature of compressed air flowing to said intake manifold by operating at least one of said second and third valves.

7. The method according to claim 1 wherein said at least one operating characteristic of said engine comprises a load on said engine.

8. The method according to claim 1 wherein said at least one operating characteristic of said engine comprises an operating speed of said engine.

9. A marine engine control system for an outboard motor comprising:
   an intake manifold directing combustion air to cylinders of an internal combustion engine;
   a compressor having an inlet and an outlet and compressing air flowing to said intake manifold;
   a charge air cooler having an inlet and an outlet and cooling compressed air flowing to said intake manifold;
   a first bypass conduit having an inlet and an outlet;
   a second bypass conduit having an inlet and an outlet;
   a first junction having an inlet from said outlet of said compressor, and having first and second outlets, said first outlet of said first junction being connected to said inlet of said charge air cooler, said second outlet of said first junction being connected to said inlet of said first bypass conduit;
   a second junction having first and second inlets, and having first and second outlets, said first inlet of said second junction being connected to said outlet of said charge air cooler, said second inlet of said second junction being connected to said outlet of said first bypass conduit, said first outlet of said second junction being connected to said intake manifold, said second outlet of said second junction being connected to said inlet of said second bypass conduit.

10. The marine engine control system according to claim 9 wherein said first and second bypass conduits are connected in series between said first junction and said inlet of said compressor.

11. The marine engine control system according to claim 10 wherein said second junction is connected in series between said first and second bypass conduits.

12. The marine engine control system according to claim 9 wherein:
    said first bypass conduit is connected in parallel with said charge air cooler;
    said second bypass conduit is connected in parallel with said compressor and said charge air cooler.

13. The marine engine control system according to claim 9, wherein:
    said compressor and said charge air cooler are connected in series, with said first junction being connected in series therebetween;

said compressor and said first bypass conduit are connected in series, with said first junction being connected in series therebetween;

said second bypass conduit is connected in parallel with the series connection of said compressor and said charge air cooler;

said second bypass conduit is connected in parallel with the series connection of said compressor and said first bypass conduit.

14. The marine engine control system according to claim 9 comprising three air flow path portions comprising:

a first air flow path portion from said first junction through said charge air cooler to said second junction;

a second air flow path portion from said first junction through said first bypass conduit to said second junction;

a third air flow path portion from said second junction through said second bypass conduit to said inlet of said compressor.

15. The marine engine control system according to claim 14 comprising a pair of valves comprising:

a first valve in said second air flow path and controlling the amount of air flowing through said first air flow path;

a second valve in said third air flow path and controlling the amount of air flowing to said intake manifold.

16. The marine engine control system according to claim 15 wherein:

said first and second valves are connected in series between said outlet of said compressor and said inlet of said compressor;

said second junction is connected in series between said first and second valves;

said second junction is connected in series between said outlet of said charge air cooler and said intake manifold.

* * * * *